(12) United States Patent
Sun

(10) Patent No.: US 9,058,226 B2
(45) Date of Patent: Jun. 16, 2015

(54) AUTOMATED EXECUTION OF PROCESSES

(75) Inventor: Fan Sun, Walldorf (DE)

(73) Assignee: SAP SE, Walldorf (DE)

( * ) Notice: Subject to any disclaimer, the term of this patent is extended or adjusted under 35 U.S.C. 154(b) by 188 days.

(21) Appl. No.: 13/416,672

(22) Filed: Mar. 9, 2012

(65) Prior Publication Data

US 2013/0239126 A1 Sep. 12, 2013

(51) Int. Cl.
*G06F 9/44* (2006.01)
*G06F 9/54* (2006.01)
*G06Q 10/06* (2012.01)
*G06N 5/00* (2006.01)

(52) U.S. Cl.
CPC .............. *G06F 9/542* (2013.01); *G06Q 10/06* (2013.01)

(58) Field of Classification Search
CPC .. G06F 9/4443; G06F 9/542; H04L 29/08072
See application file for complete search history.

(56) References Cited

U.S. PATENT DOCUMENTS

| | | | |
|---|---|---|---|
| 5,043,915 A | 8/1991 | Suwa et al. | |
| 5,148,513 A | 9/1992 | Koza et al. | |
| 5,644,686 A | 7/1997 | Hekmatpour | |
| 6,427,142 B1 | 7/2002 | Zachary et al. | |
| 8,271,642 B1 * | 9/2012 | Sankararaman et al. | 709/224 |
| 8,327,318 B2 | 12/2012 | Chaar et al. | |
| 8,370,188 B2 | 2/2013 | Bernardini et al. | |
| 8,527,327 B1 | 9/2013 | Lawrence | |
| 8,527,811 B2 | 9/2013 | Gilbert et al. | |
| 8,600,992 B2 | 12/2013 | Choi et al. | |
| 8,660,878 B2 | 2/2014 | Bernardini et al. | |
| 8,738,414 B1 | 5/2014 | Nagar et al. | |
| 2002/0076674 A1 | 6/2002 | Kaplan | |
| 2008/0181100 A1 * | 7/2008 | Yang et al. | 370/216 |
| 2008/0220873 A1 | 9/2008 | Lee et al. | |
| 2008/0294423 A1 | 11/2008 | Castellani et al. | |
| 2009/0055795 A1 | 2/2009 | Finlayson et al. | |
| 2009/0063387 A1 | 3/2009 | Beaty et al. | |
| 2009/0089869 A1 * | 4/2009 | Varghese | 726/7 |
| 2009/0275414 A1 | 11/2009 | Lee et al. | |
| 2011/0055699 A1 | 3/2011 | Li et al. | |
| 2011/0087689 A1 * | 4/2011 | Ziegler | 707/769 |
| 2012/0209800 A1 * | 8/2012 | Nayak et al. | 706/47 |
| 2012/0330869 A1 | 12/2012 | Durham | |
| 2013/0138473 A1 | 5/2013 | Balko et al. | |

OTHER PUBLICATIONS

Shuoqi Li, et al. "Event Detection Services Using Data Service Middleware in Distributed Sensor Networks", 2003.*

"U.S. Appl. No. 13/545,754, Examiner Interview Summary Sep. 9, 2014", 3 pgs.

(Continued)

*Primary Examiner* — Lechi Truong
*Assistant Examiner* — Abdou Seye
(74) *Attorney, Agent, or Firm* — Schwegman Lundberg & Woessner, P.A.

(57) ABSTRACT

Example systems and methods of executing processes are described. In one implementation, a method identifies an event and accesses a business rule to identify and execute a process associated with the event. A decision table is accessed to identify multiple conditions associated with the event. The decision table is also accessed to identify multiple actions associated with the event. The multiple conditions and actions were previously defined by at least one user of the system. The event and the multiple conditions are evaluated to determine whether to perform at least one of the multiple actions.

18 Claims, 8 Drawing Sheets

(56) References Cited

OTHER PUBLICATIONS

"U.S. Appl. No. 13/545,754, Response filed Oct. 3, 2014 to Non Final Office Action mailed Jul. 3, 2014", 12 pgs.

"U.S. Appl. No. 13/545,754, Non Final Office Action mailed Jul. 3, 2014", 18 pgs.

U.S. Appl. No. 13/545,754, Final Office Action mailed Jan. 29, 2015, 17 pgs.

* cited by examiner

| CONDITION 1 | CONDITION 2 | ACTION |
|---|---|---|
| A1 | B1 | PROCESS1 |
| A2 | B2 | PROCESS2 |
| A3 | B3 | PROCESS3 |
| A4 | B4 | PROCESS4 |

AUTOMATED EXECUTION OF PROCESSES

FIELD

The present disclosure relates generally to process execution and, more specifically, to the automated execution of one or more processes in response to an event.

BACKGROUND

Many computing systems offer pre-defined rules and logic that define the operation of the computing system as well as applications and processes executing on the computing system. In some situations, the pre-defined rules and logic are managed by system developers or programmers, and cannot be modified by an end user (e.g., a customer). In these situations, customer changes to an application or process require the expertise of a programmer or developer, which can be time consuming and costly.

BRIEF DESCRIPTION OF THE DRAWINGS

The present disclosure is illustrated by way of example and not limitation in the figures of the accompanying drawings, in which like references indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for automating the execution of one or more processes in response to an event. An event may be received from, for example, a system, device, component or procedure. Events may be associated with the same system that detects the event or associated with an external system or procedure. Additionally, an event may be identified in response to an activity or setting, such as detecting a particular activity, detecting a parameter that exceeds a threshold value, and the like.

As discussed herein, a process includes any type of job, action, procedure, function, operation, activity, task, and the like. A particular process may, for example, perform one or more functions, monitor one or more parameter settings, monitor completion of a task, and so forth. In some embodiments, a process monitors activities associated with an external system or procedure. In other embodiments, a process monitors activities associated with an internal system or procedure (e.g., monitoring the system in which the process is executing).

The systems and methods described herein support the monitoring of events in a computing environment and the definition of various actions performed in response to those events. In some embodiments, end users (e.g., customers) are able to define conditions that trigger specific actions in response to one or more events. The described systems and methods allow end users to define the handling of processes in the computing environment without having computer programming or development knowledge. These actions may be performed in addition to other processes that are triggered based on business rules or other definitions not accessible to a typical end user.

In some embodiments, an end user can customize various conditions at design time. Additionally, the various conditions allow the end user to monitor multiple actions on a step-by-step basis. One or more conditions and business rules can trigger any number of actions in response to an identified event.

Figure 1:
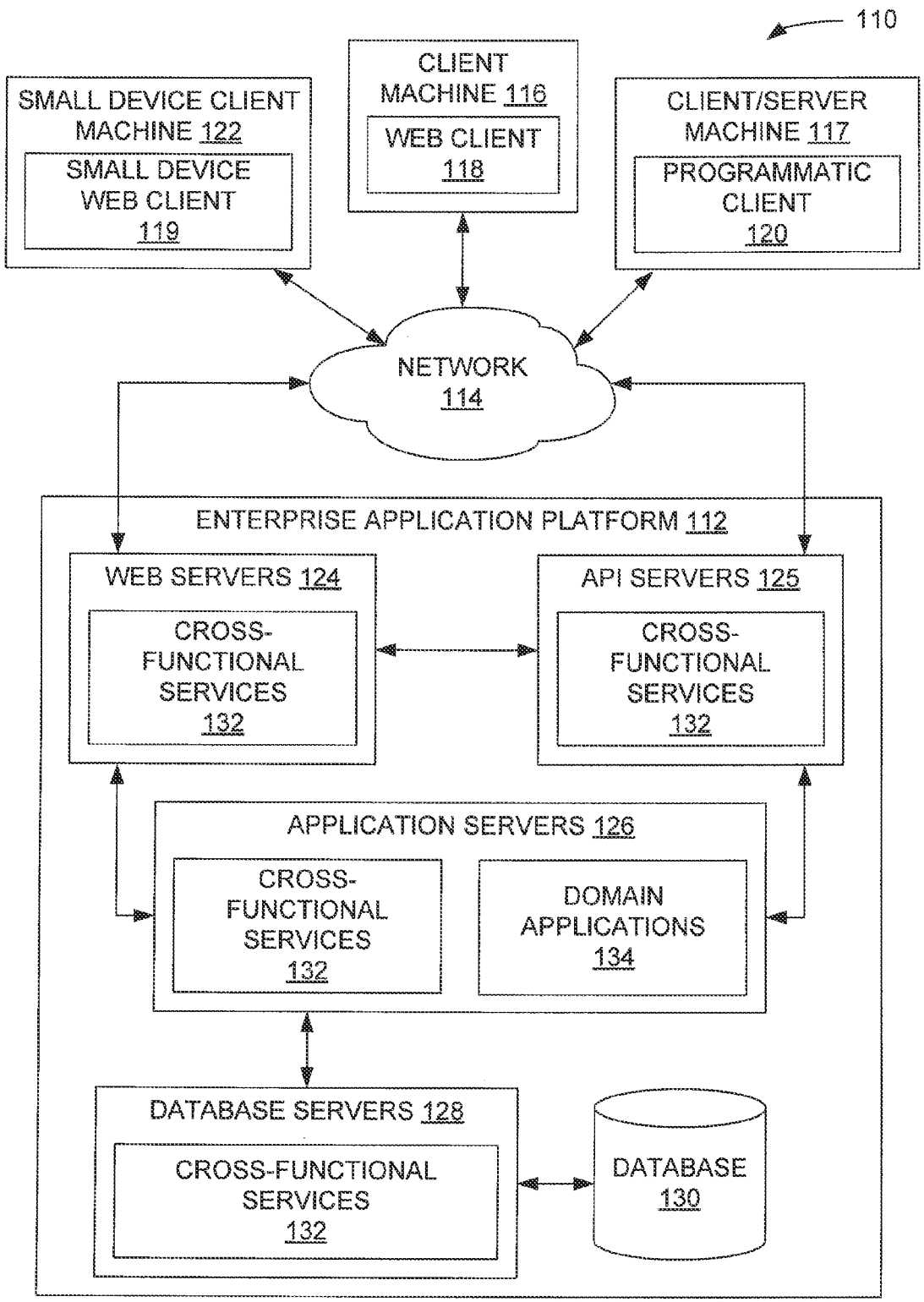
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer browser developed by Microsoft Corporation of Redmond, Wash.), a small device client machine 122 with a small device web client 119 (e.g., a browser without a script engine), and a client/server machine 117 with a programmatic client 120.

Turning specifically to the enterprise application platform 112, web servers 124, and Application Program Interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, Application Program Interface (API) servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is of course not limited to such an architecture, and could equally well find application in a distributed, or peer-to-peer, architecture system.

Figure 2:
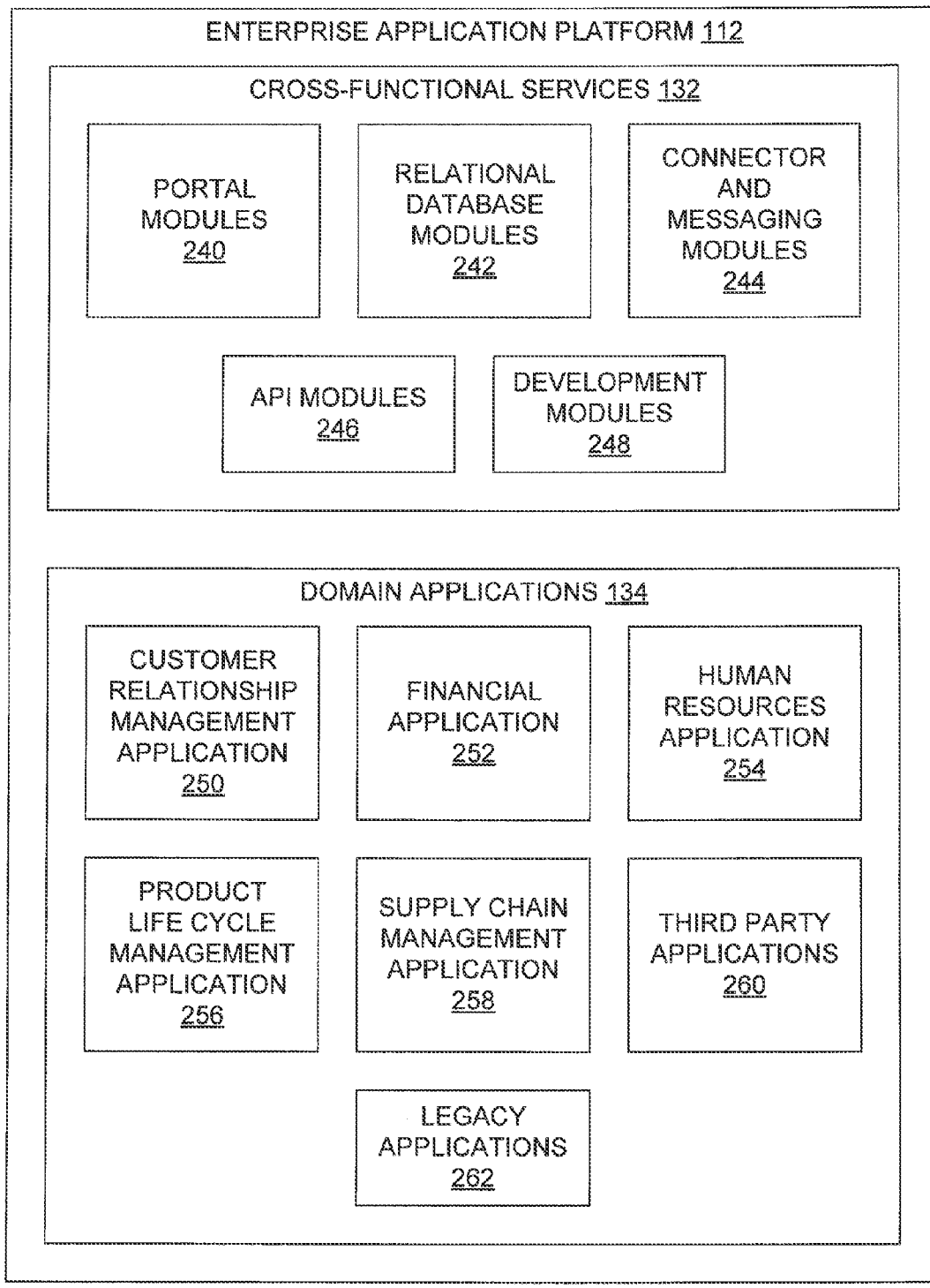
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, Application Program Interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The Application Program Interface (API) modules 246 may enable the development of service-based applications by exposing an interface to existing and new applications as services. Repositories may be included in the platform as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, the customer relationship management applications 250 may enable access to and facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize the financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

The human resources applications 254 may be utilized by enterprise personal and business processes to manage, deploy, and track enterprise personnel. Specifically, the human resources applications 254 may enable the analysis of human resource issues and facilitate human resource decisions based on real-time information.

The product life cycle management applications 256 may enable the management of a product throughout the life cycle of the product. For example, the product life cycle management applications 256 may enable collaborative engineering, custom product development, project management, asset management, and quality management among business partners.

The supply chain management applications 258 may enable monitoring of performances that are observed in supply chains. The supply chain management applications 258 may facilitate adherence to production plans and on-time delivery of products and services.

The third-party applications 260, as well as legacy applications 262, may be integrated with domain applications 134 and utilize cross-functional services 132 on the enterprise application platform 112.

Figure 3:
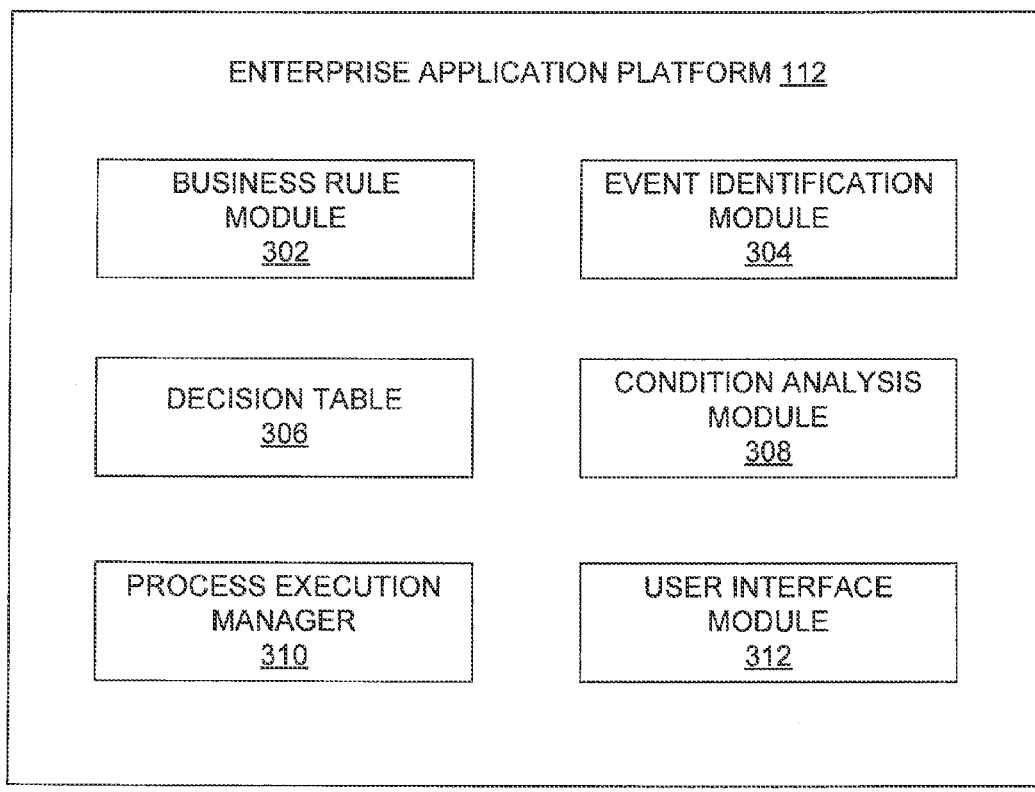
FIG. 3 is a block diagram of example modules utilized in the enterprise application platform of FIG. 1 for executing processes.

FIG. 3 is a block diagram of example modules utilized in the enterprise application platform of FIG. 1 for executing processes. In the example of FIG. 3, the enterprise application platform 112 may include a business rule module 302 and an event identification module 304. Business rule module 302 maintains and manages various business rules associated with the operation of one or more systems or platforms, such as enterprise application platform 112. In some embodiments, business rules are logical statements that identify and control various functions related to an organization or business. These business rules allow an organization to describe, for example, operations, policies, business goals, and business guidelines. In particular embodiments, one or more business rules define the manner in which various events are to be handled.

Event identification module 304 detects various events occurring in one or more systems, Event identification module 304 may receive an event from an external system or may identify events generated within the same system in which event identification module 304 is located. In some embodiments, event identification module 304 identifies a source of the event as well as other parameters associated with the event (e.g., event time, event date, event description, and system status at the time of the event). In particular implementations, event identification module 304 executes a process in response to identification of a specific event. Additional details regarding the execution of processes are discussed herein.

In the example of FIG. 3, the enterprise application platform 112 may further include a decision table 306 and a condition analysis module 308. Decision table 306 includes multiple conditions associated with events, system parameters, and the like. Decision table 306 also includes actions associated with a particular condition or a combinations of conditions. These actions are to be performed when the associated condition (or combination of conditions) are satisfied. The conditions and actions defined in decision table 306 are further discussed herein. Condition analysis module 308 analyzes (or evaluates) the conditions to determine whether to perform one or more actions in response to an identified event.

Additionally, the enterprise application platform 112 shown in FIG. 3 may include a process execution manager 310 and a user interface module 312. Process execution manager 310 handles the execution of one or more processes in any number of systems. For example, process execution manager 310 can manage multiple processes executed in response to identification of a particular event. User interface module 312 provides an end user access to, for example, information contained in decision table 306. Further, the user interface module 312 may provide other types of users, such as programmers, content managers, administrators, and the like, access to various types of data, parameters, settings, business rules, and so forth.

Figure 4:
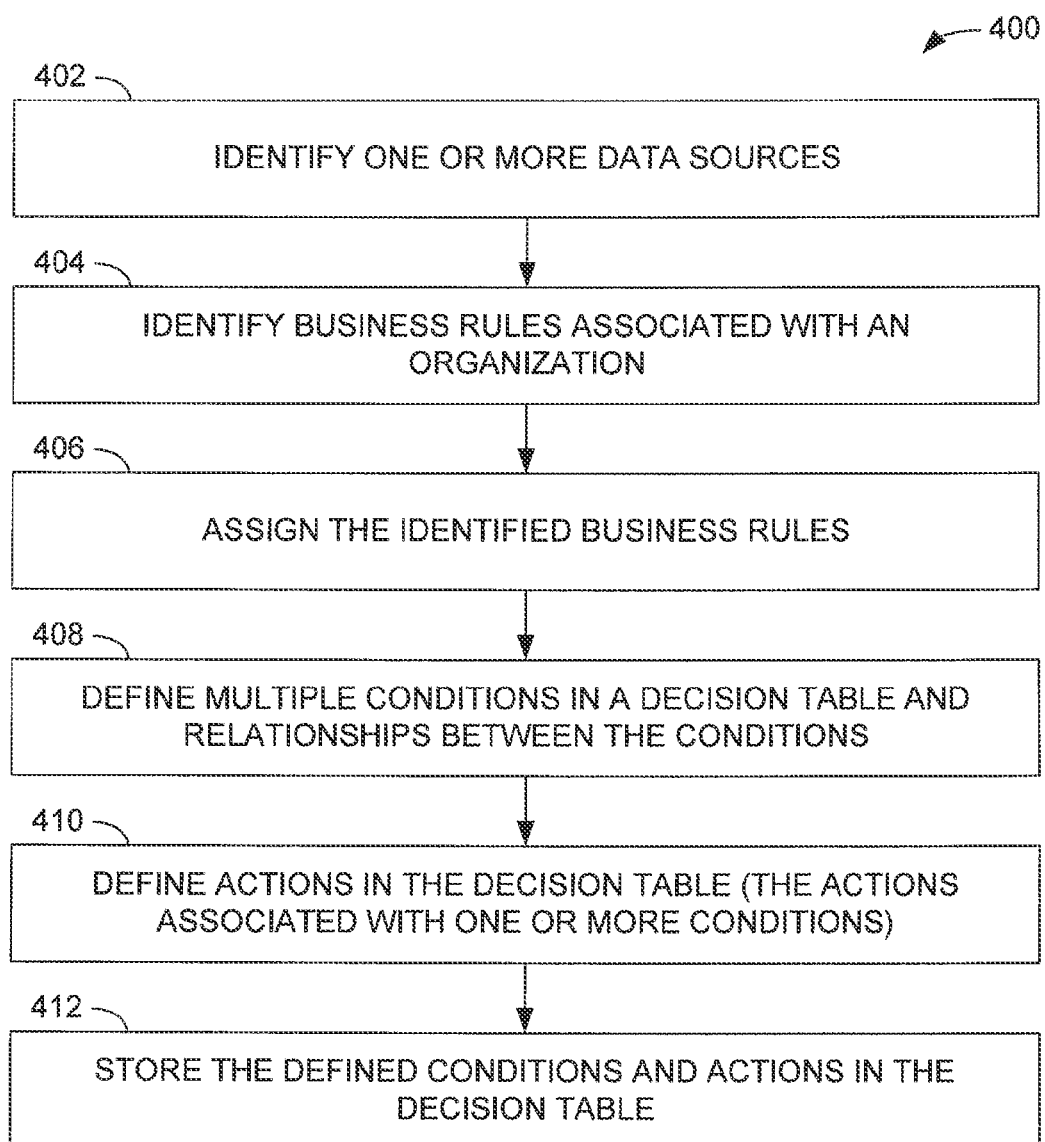
FIG. 4 is a flow diagram of an example method of identifying business rules, and defining conditions and actions in a decision table.

FIG. 4 is a flow diagram of an example method 400 of identifying business rules, and defining conditions and actions in a decision table. Initially, method 400 identifies one or more data sources at 402 from which events and other data may be received. In some embodiments, these data sources are monitored by one or more systems to identify events and related information. Method 400 continues by identifying business rules associated with an organization at 404. As mentioned above, business rules may include statements that identify and control various business-related functions related to an organization. The identified business rules are then assigned at 406 to one or more events, activities, operations, business processes, and the like.

Method 400 continues by defining multiple conditions in a decision table and defining relationships between those conditions at 408. As discussed herein, events may be evaluated using multiple conditions when determining how to respond to the event (i.e., what action to take upon identification of the event). At 410, method 400 defines these actions in the decision table, The defined conditions and actions are stored in the decision table at 412. Thus, the decision table includes multiple conditions and corresponding actions that are applied and analyzed upon identification of various events.

In some embodiments, the conditions and actions in the decision table are defined by an end user (e.g., a customer) of the system implementing the identified business rules. As discussed in greater detail herein, the conditions and actions may be applied in addition to the business rules, thereby allowing the customer to customize certain actions based on the specific needs of the customer's organization. Additionally, the end user can easily modify the data stored in the decision table to change the manner in which the system responds to various events. For example, these changes to the data in the decision table are entered by the end user through user interface module 312 (FIG. 3), without requiring any reprogramming of the system or modification of existing business rules.

Figure 5:
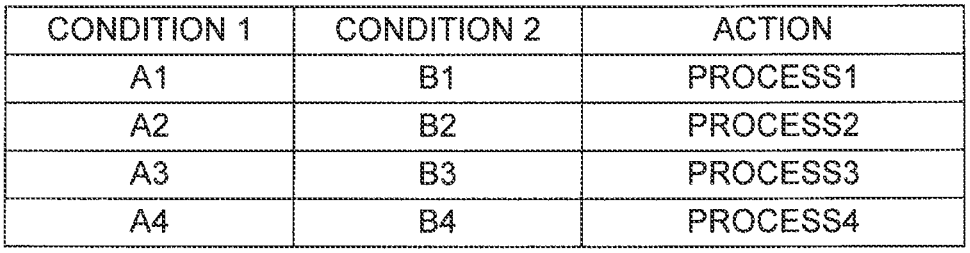
FIG. 5 is an example decision table including multiple conditions and multiple actions.

FIG. 5 is an example decision table 500 including multiple conditions and multiple actions. In a particular embodiment, decision table 500 corresponds to decision table 306 shown in FIG. 3. Decision table 500 includes two columns for conditions ("Condition 1" and "Condition 2") and one column for actions. Decision table 500 is associated with a specific event, such as detection of an activity or operation. Upon detection of the specific event, the conditions shown in decision table 500 are applied to the event and evaluated. In the example of FIG. 5, when an event is identified, four pairs of conditions are evaluated with respect to the event. In particular, condition A1 and condition B1 are applied to the event. If both conditions A1 and B1 are true, then "Process1" is performed. Similarly, if conditions A2 and B2 are both true, then "Process2" is performed.

The conditions in decision table 500 include any parameters, settings or other information associated with an event. Additionally, the conditions may include settings or information associated with other systems or procedures at the time the event occurred. Example conditions include an event type, an event source, the status of a particular system or procedure when an event occurred, and the like.

In some embodiments, multiple actions may be implemented in response to a single event if multiple condition pairs are satisfied. For example, Process1 and Process2 are both performed if the corresponding conditions A1/B1 and A2/B2 are satisfied. In other embodiments, only one action is performed in response to an event. In these embodiments the condition pairs in decision table 500 are evaluated in a particular order (such as top to bottom as oriented in FIG. 5). Once a condition pair is satisfied, the corresponding action is executed and no further condition pairs are evaluated.

In the example of FIG. 5, Condition 1 and Condition 2 are ANDed (logical AND) together to determine whether to take the associated action. Thus, both conditions must be satisfied to execute the corresponding action. In alternate embodiments, other logical operations (e.g., OR, NOT, and XOR) are applied to Condition 1 and Condition 2. This example illustrates two conditions (Condition 1 and Condition 2) applied to each event. However, alternate embodiments may include any number of conditions applied to events in any manner.

Decision table 500 is associated with a specific event, such as detection of an activity or operation. In alternate embodiments, decision table 500 includes data associated with multiple events. In these embodiments, decision table 500 may include one or more additional columns that identify the event (or events) with which the conditions and actions are associated.

Although two conditions are associated with each action in decision table 500, alternate embodiments may include different numbers of conditions associated with different actions. For example, one action may have two associated conditions (as shown in FIG. 5) while another action has three associated conditions (Condition 1, Condition 2, and Condition 3) which may be related with different logical operations. In one implementation, the logical operation is "Condition 1 AND Condition 2 AND Condition 3". In another implementation the logical operation is "(Condition 1 OR Condition 2) AND Condition 3". As mentioned above, any type of logical operator can be applied to the conditions in any manner.

Figure 6:
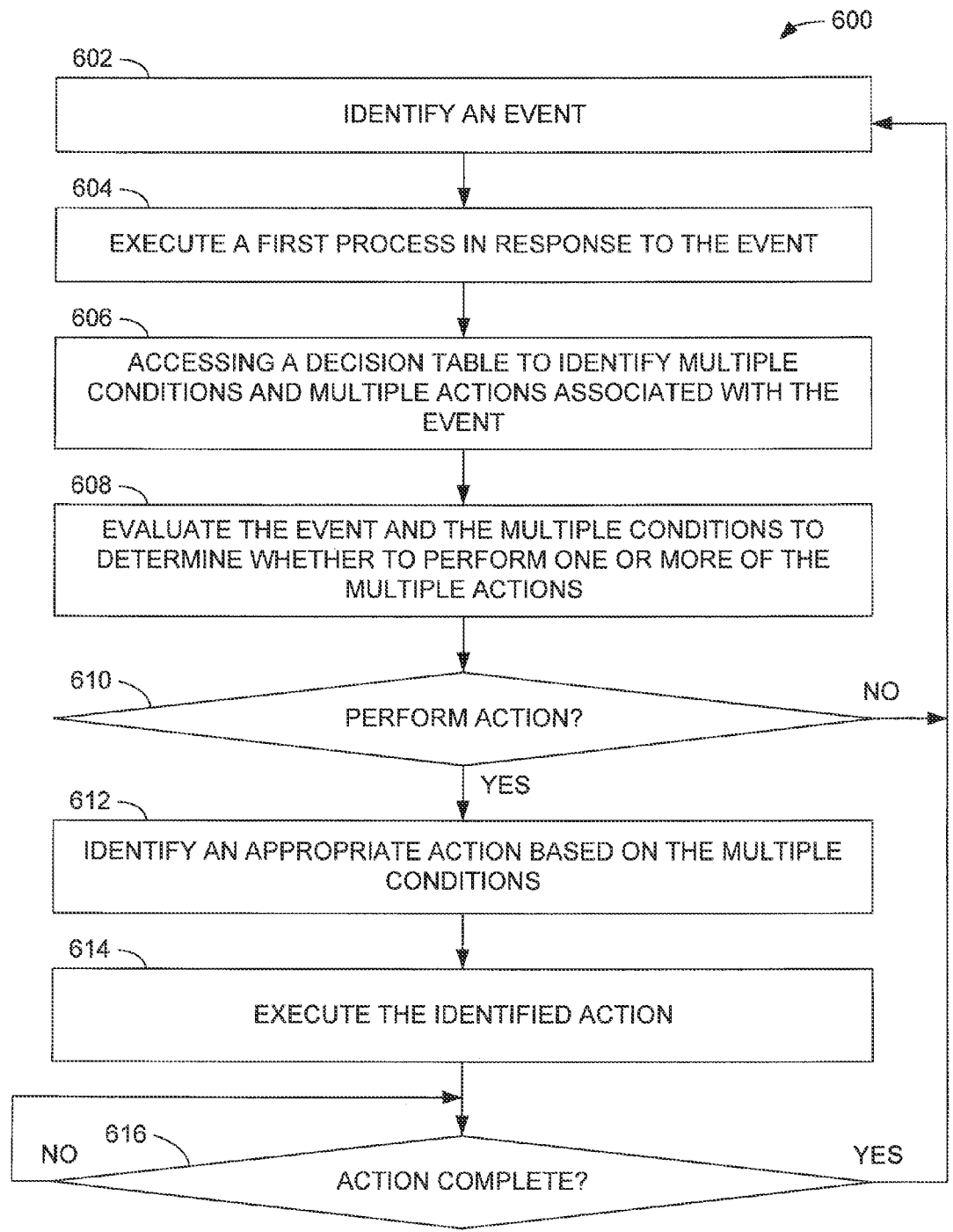
FIG. 6 is a flow diagram of an example method of executing one or more processes in response to an event.

FIG. 6 is a flow diagram of an example method 600 of executing one or more processes in response to an event. Initially, method 600 identifies an event at 602. In response to the identified event, a first process is executed at 604 based, for example, on a business rule. In other embodiments, the first process is executed based on an organizational policy or other event-handling process. In one implementation, the first process is a monitoring process that monitors the handling and response to the event by other systems or procedures.

Method 600 continues by accessing a decision table to identify multiple conditions and multiple actions associated with the event at 606. As discussed above, the decision table may include any number of conditions and associated actions. The event and the multiple conditions are evaluated at 608 to determine whether any conditions (e.g., condition pairs) are satisfied, indicating that one or more actions should be performed in response to the event. At 610, the procedure determines whether to perform one or more actions, If evaluation of the multiple conditions indicates no action to perform, method 600 returns to 602 to await the next event.

If, at 610, one or more actions are to be performed, method 600 identifies an appropriate action (or multiple appropriate actions) at 612 based on evaluation of the multiple conditions. The identified action is executed at 614. When the action is determined to be complete at 616, method 600 returns to 602 to await the next event.

Figure 7:
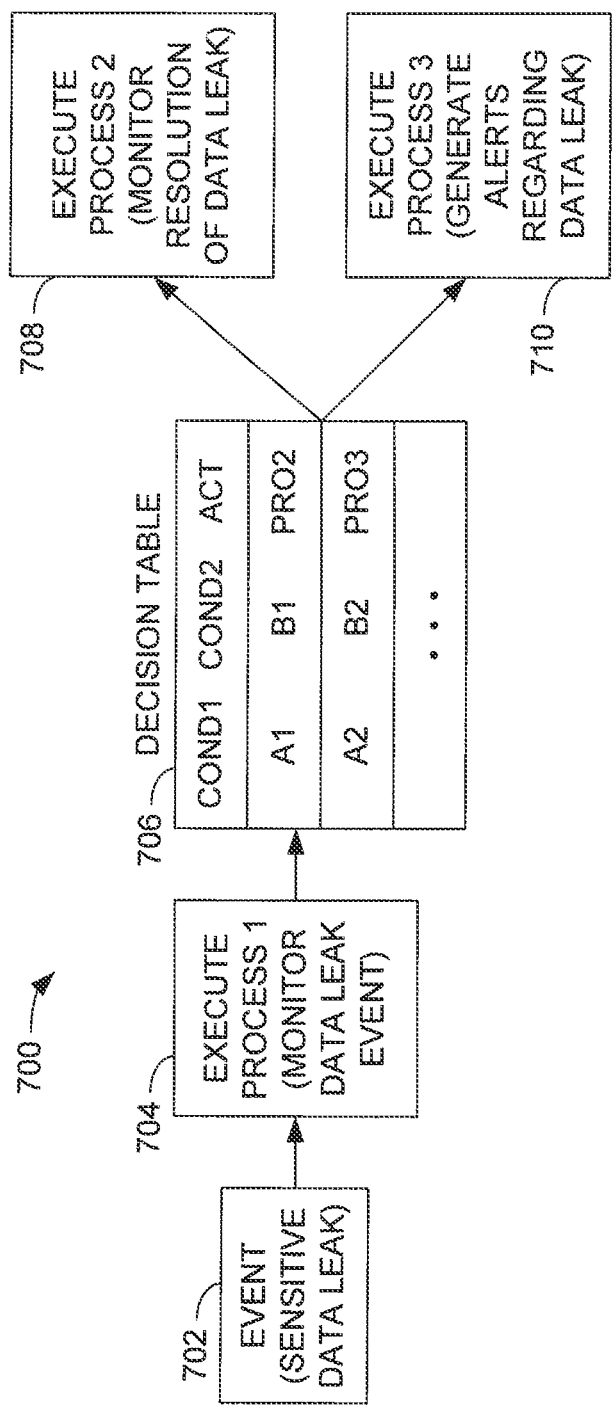
FIG. 7 is an example graphical display of executing a process in response to an event.

FIG. 7 is an example graphical display 700 illustrating the execution of one or more processes in response to an event. In this example, an event 702 is identified by a system or procedure. Event 702 is a leak of sensitive data (e.g., sensitive financial data associated with an organization). A pre-defined business rule causes the execution of Process 1 at 704, which monitors the data leak event. In this example, the business rule specifies the execution of Process 1 in response to any data leak event, regardless of the severity of the data leak.

After executing Process 1, the event is evaluated based on conditions in a decision table 706, which is associated with the event, For example, decision table 706 may be associated with any type of data leak, or associated with data leaks of a particular severity. Decision table 706 includes two condition columns (COND1 and COND2) and one action column (ACT). Although two example condition pairs are shown in FIG. 7 (i.e., A1/B1 and A2/B2), decision table 706 may include any number of condition pairs and corresponding actions.

If the first pair of conditions (A1 and B1) in decision table 706 are satisfied, Process 2 is executed at 708. Process 2 monitors the resolution of the data leak, such as monitoring tasks performed to remedy the problem to he sure the tasks are performed in a timely manner. If the second pair of conditions (A2 and B2) in decision table 706 are satisfied, Process 3 is executed at 710. Process 3 generates one or more alerts regarding the data leak. For example, the alerts provided may depend on the severity of the data leak. High severity leaks may require more alerts or alerts send to higher-level employees (such as managers and officers) while low severity leaks may require fewer alerts send to lower-level employees.

In some embodiments, the execution of Process 2 and/or Process 3 does not alter the execution of Process 1, which was executed based on a business rule or other policy. In other embodiments, the execution of Process 2 or Process 3 may replace or supersede the execution of Process 1.

Figure 8:
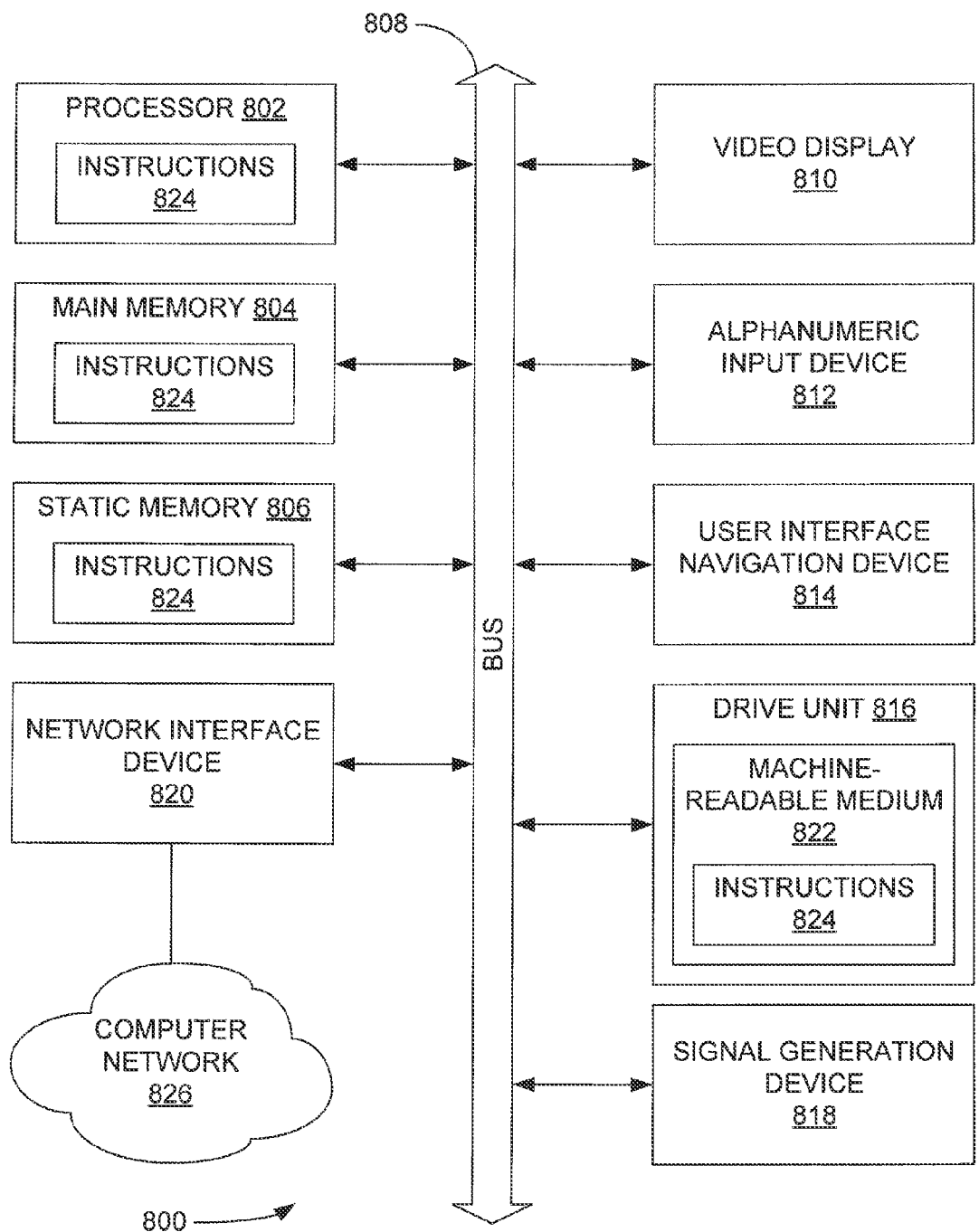
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (for example, a central processing unit (CPU), a graphics processing unit (GPU), or both), a main memory 804 (for example, random access memory), and static memory 806 (for example, static random-access memory), which communicate with each other via bus 808. The processing system 800 may further include video display unit 810 (for example, a plasma display, a liquid crystal display (LCD), or a cathode ray tube (CRT)). The processing system 800 also includes an alphanumeric input device 812 (for example, a keyboard), a user interface (UI) navigation device 814 (for example, a mouse), a disk drive unit 816, a signal generation device 818 (for example, a speaker), and a network interface device 820.

The disk drive unit 816 (a type of non-volatile memory storage) includes a machine-readable medium 822 on which is stored one or more sets of data structures and instructions 824 (for example, software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 826 via network interface device 820 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 800) or one or more hardware modules of a computer system (for example, a processor 802 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (for example, by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (for example, within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
   identifying an event occurring in a system;
   in response to identifying the event, accessing a business rule identifying a process for execution in response to the event;
   executing the process based on the business rule, the process including monitoring a response to the event;
   accessing a decision table to identify a plurality of conditions associated with the event, the plurality of conditions previously defined by at least one user of the system;
   accessing the decision table to identify a plurality of actions associated with the event, the plurality of actions previously defined by at least one user of the system;
   evaluating, using one or more processors, the event and the plurality of conditions to determine whether to perform at least one of the plurality of actions; and
   performing the at least one of the plurality of actions in response to determining at least one of the plurality of conditions is satisfied, the performing of at least one of the plurality of actions including monitoring a resolution of the event, the monitoring of the resolution of the event including monitoring tasks performed by the system to remedy the event.

2. The method of claim 1, wherein the performing of the at least one of the plurality of actions is responsive to determining at least one of the plurality of conditions is satisfied.

3. The method of claim 1, the accessing of the business rule including accessing a plurality of business rules associated with the event.

4. The method of claim 1, the accessing of the decision table to identify a plurality of conditions associated with the event including accessing a plurality of pairs of conditions associated with the event.

5. The method of claim 1, the accessing the decision table to identify a plurality of actions associated with the event including accessing the plurality of pairs of conditions associated with each of the plurality of actions.

6. The method of claim 1, further comprising receiving at least one updated condition from the user.

7. The method of claim 6, further comprising updating the decision table responsive to receiving the updated condition from the user.

8. The method of claim 1, further comprising receiving at least one updated action from the user.

9. The method of claim 8, further comprising updating the decision table responsive to receiving the updated action from the user.

10. The method of claim 1, the evaluating of the event and the plurality of conditions includes determining whether the event satisfies at least one of the plurality of conditions.

11. A non-transitory computer-readable storage medium comprising instructions that, when executed by at least one processor of a machine, cause the machine to perform operations comprising:
    identifying an event occurring in a system;

executing a process responsive to a business rule associate with the event, the process including monitoring a response to the event by the system;

accessing a decision table to identify a plurality of conditions associated with the event, the plurality of conditions previously defined by at least one user of the system;

accessing the decision table to identify a plurality of actions associated with the event, the plurality of actions previously defined by at least one user of the system;

evaluating the event and the plurality of conditions to determine whether to perform at least one of the plurality of actions; and performing at least one of the plurality of actions responsive to determining at least one of the plurality of conditions is satisfied, the performing of the at least one of the plurality of actions including monitoring a resolution of the event, the monitoring of the resolution of the event including monitoring tasks performed by the system to remedy the event.

12. The non-transitory computer-readable storage medium of claim 11, the accessing of the decision table to identify a plurality of conditions associated with the event including accessing plurality of pairs of conditions associated with the event.

13. The non-transitory computer-readable storage medium of claim 11 the accessing of the decision table to identify a plurality of actions associated with the event including accessing a plurality of pairs of conditions associated with each of the plurality of actions.

14. The non-transitory computer-readable storage medium of claim 11, further comprising receiving at least one updated condition from the user.

15. The non-transitory computer-readable storage medium of claim 14, further comprising updating the decision table responsive to receiving the updated condition from the user.

16. The non-transitory computer-readable storage medium of claim 12, the evaluating of the event and the plurality of conditions includes determining whether the event satisfies at least one of the plurality of conditions.

17. A system comprising:

at least one processor; and modules comprising instructions that are executable by the at least one processor, the modules comprising:

an event identification module to identify an event;

a process execution manager to execute a process responsive to a business rule associated with the event, the process including monitoring a response to the event by the system;

a decision table that defines a plurality of conditions associated with the event and defines a plurality of actions associated with the event, the plurality of conditions and the plurality of actions defined by at least one user of the system;

a condition analysis module to evaluate the event and the plurality of conditions to determine whether to perform at least one of the plurality of actions; and a process execution manager to execute at least one of the plurality of actions in response to determining at least one of the plurality of conditions is satisfied, the performing of at least one of the plurality of actions including monitoring a resolution of the event, the monitoring of the resolution of the event including monitoring tasks performed by the system to remedy the event.

18. The system of claim 17, further comprising a user interface module to allow user access to the plurality of conditions and the plurality of actions defined in the decision table.

* * * * *